June 18, 1940.   J. P. TRIPP   2,205,002
ARC WELDING APPARATUS
Filed March 7, 1938   5 Sheets-Sheet 1

INVENTOR
J. P. TRIPP
BY J. D. O'Connell
ATTORNEY

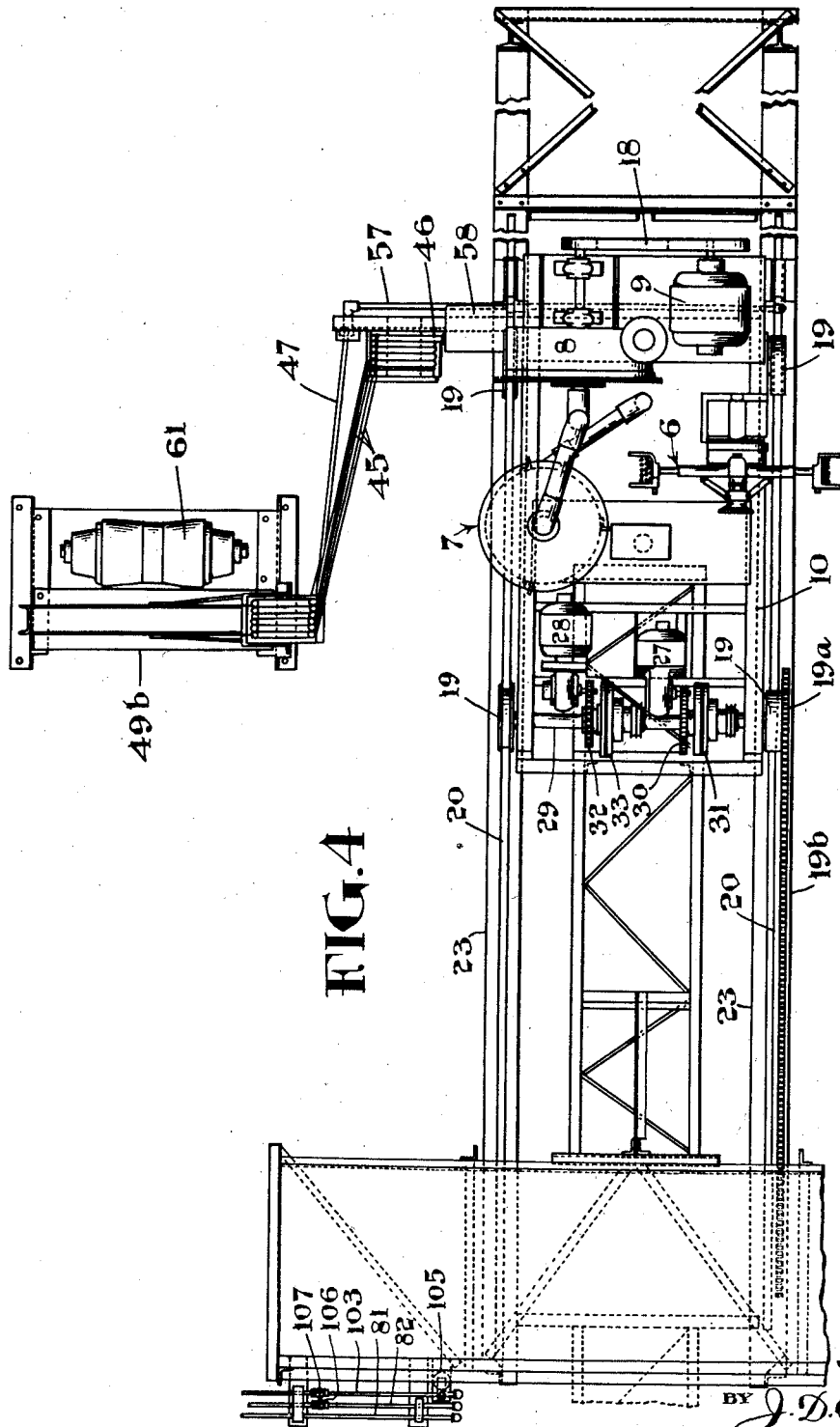

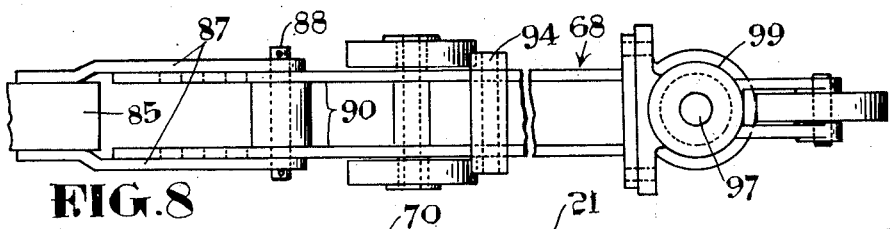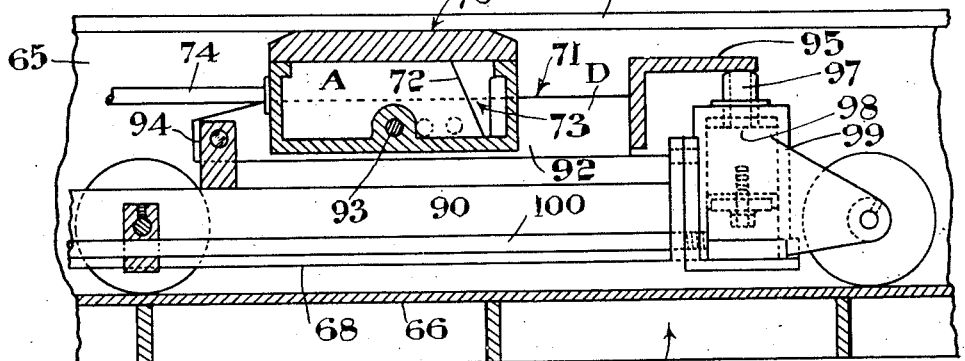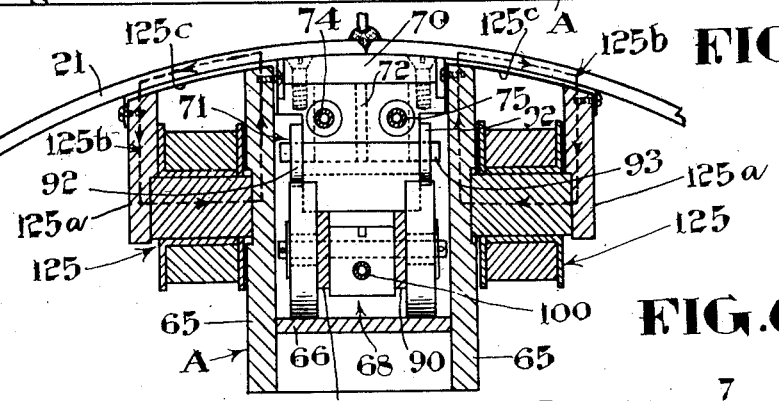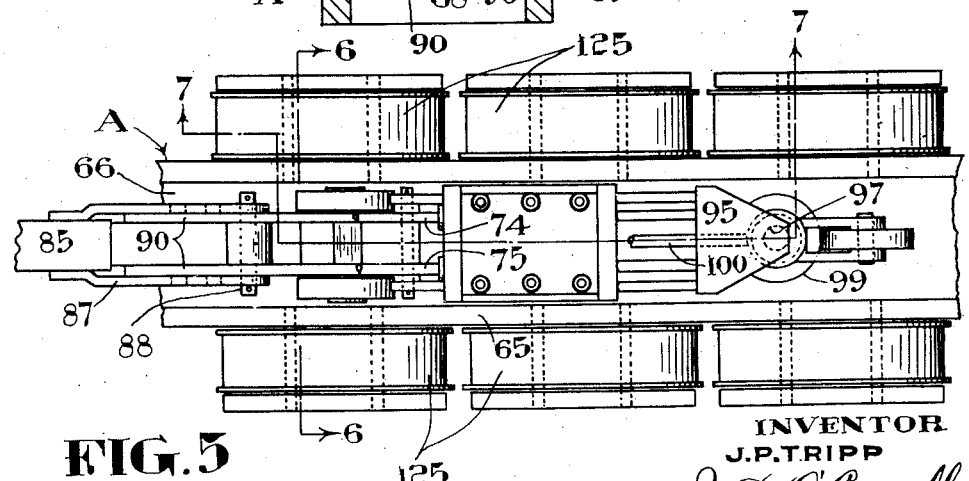

Patented June 18, 1940

2,205,002

UNITED STATES PATENT OFFICE 2,205,002

ARC WELDING APPARATUS

John P. Tripp, Montreal, Quebec, Canada

Application March 7, 1938, Serial No. 194,372

1 Claim. (Cl. 219—6)

This invention relates to improvements in arc welding machines used in connection with the seam welding of plates or cylindrical objects such as sheet metal pipes, tanks and the like.

It is an object of this invention to provide a compact, self-contained machine by which seam welding operations, particularly the longitudinal seam welding of pipes and tanks, may be easily and quickly accomplished without the assistance of overhead cranes, hoists or other separate work lifting devices usually required for positioning the work with reference to the welding head. To this end the machine is provided with a work-transporting truck which serves to push the pipe or other cylindrical work piece onto an elevated, horizontally extending work-supporting arm, to which the work is fastened during the seam welding operation. The truck preferably travels on a normally horizontal platform which is pivoted so that it may be swung downwardly to lower the truck out of engagement with the work after the latter has been placed on said arm.

It is also an object of this invention to provide a machine of the character described which readily lends itself to the use of either electro-magnetic or mechanical clamping means for anchoring the work to the work-supporting arm.

A further object is to provide a compact machine of the character described in which the welding head is suspended from a truck running on track rails carried by a horizontal portion of the machine frame overlying the elevated work-supporting arm, said truck being power driven so that it may be readily moved in the lengthwise direction of the work or seam.

A further object is to provide a machine of the character described in which a backing plate is mounted on a small truck carried by the work-supporting arm, said truck being coupled to the welding head truck to travel therewith.

A still further object is to provide improved means for supporting the cables through which current is supplied to the welding head and other elements of the machine.

Proceeding now to a more detailed description reference will be had to the accompanying drawings, in which—

Figure 2 also shows an auxiliary cable supporting and cabinet structure which is omitted from Figure 1.

Figure 4 is a top plan view of the installation appearing in Figures 1 and 2.

Figure 5 is a fragmentary top plan view of the work-supporting arm and backing plate assembly carried thereby. This view shows the manner in which the backing plate and the backing plate truck are mounted to travel longitudinally of the work-supporting arm. It also shows the manner in which magnets may be attached to opposite sides of the arm to provide magnetic clamping or work-holding means.

Figure 6 is a transverse sectional view along the line 6—6 of Figure 5.

Figure 7 is a longitudinal sectional view along the line 7—7 of Figure 5, and

Figure 8 is a top plan view of the backing plate truck as it appears with the backing plate removed therefrom.

Figure 7a is a longitudinal sectional view through the hollow backing plate showing the manner in which the return pipe of the backing plate cooling system is directed upwardly into a recess of the backing plate cover to prevent trapping of air that might result in interference with the circulation of the cooling medium.

Figure 1:
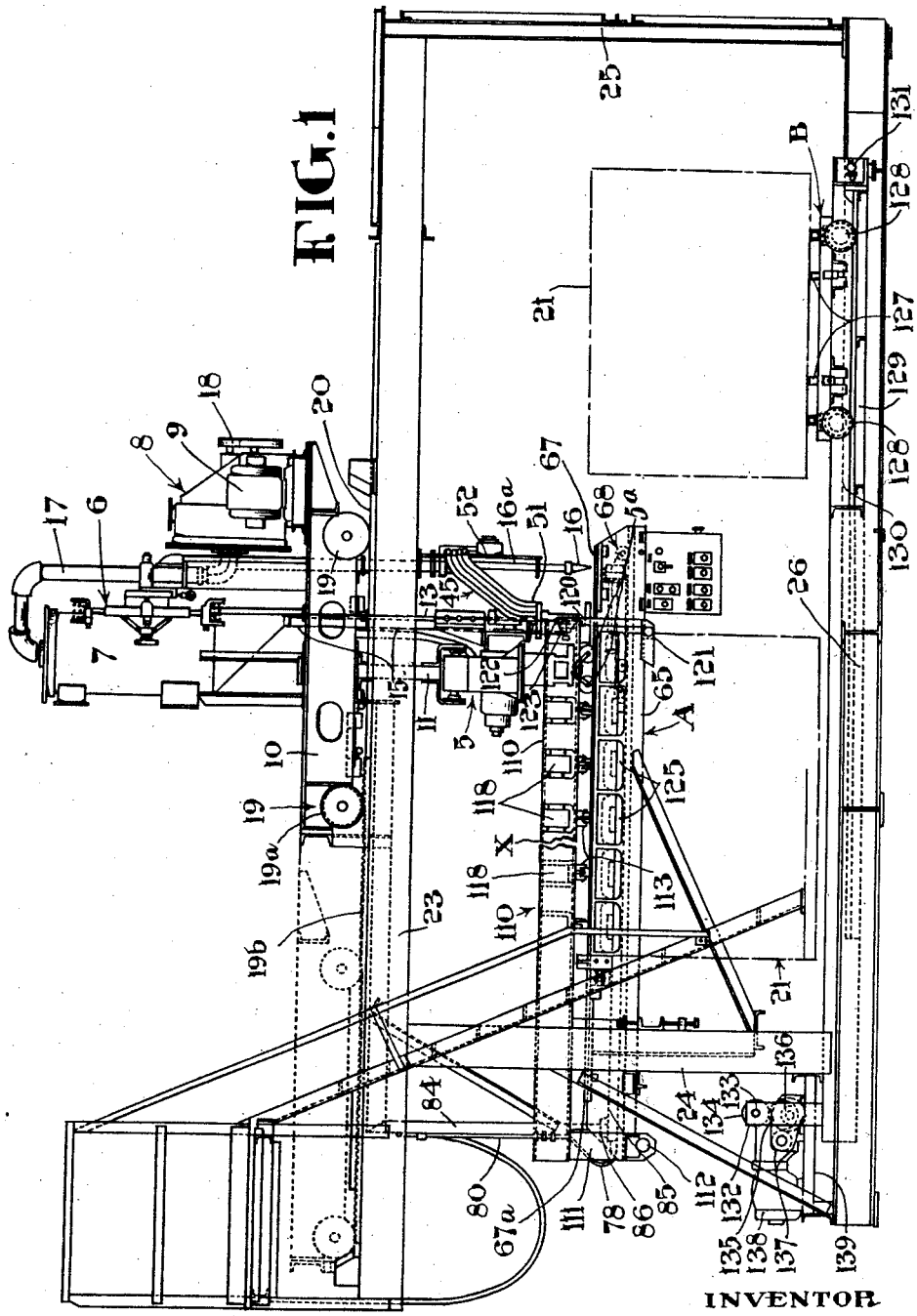
Figure 1 is a side elevation of a complete welding machine installation designed in accordance with this invention.

The particular machine shown in the present drawings is designed to facilitate the longitudinal seam welding of pipes, tanks and other cylindrical objects by the welding process known to the trade as the "Unionmelt" process. It therefore comprises certain conventional elements well known in connection with this particular welding process. Such elements, include the welding head 5, electrode reel 6, flux tank 7, centrifugal compressor 8, and compressor operating motor 9. The head 5 is suspended from a welding head truck 10 by a suitable suspension member 11 (Figure 1). The reel 6 is mounted on a standard 12 rising from the truck 10. A bare wire electrode 13 is suitably passed from reel 6 to the welding head 5 as indicated in Figure 1. The flux tank 7 is mounted on truck 10 and is provided with the usual flexible flux discharge pipe 15 (Figure 1) through which the flux is fed to the weld through the welding head 5 in the manner characteristic of the "Unionmelt" process. According to this process part of the flux is thus fused over the weld to form a protective coat which remains until the molten steel from the electrode solidifies and cools. The surplus flux is returned to tank 7 through nozzle 16 and pipe 16a by the suction of compressor 8 whose suction side is connected to the upper portion of tank 7 by suction pipe 17. Suitable filter bags (not shown) are arranged in the upper portion of tank 7 in accordance with the "Unionmelt" process to prevent the flux being drawn into the suction pipe 17 by the compressor 8. The compressor 8 is driven from motor 9 through the agency of a suitable belt drive 18. The traction wheels 19 of truck 10 travel on overhead rails 20 lying above and parallel with the length of the work or pipe 21 when the latter is arranged on the work-supporting arm A as indicated by dotted lines in Figure 1. The rails 20 are mounted on laterally spaced eye beams 23 supported by vertical frame structures 24 and 25 rising from the base frame 26. The eye beams 23 are spaced apart to provide an intervening space along which the welding head suspension member 11 travels as the welding head 5 and truck 10 are shifted to different longitudinal seam welding positions along the length of the work 21.

The propelling mechanism of truck 10 is substantially the same as the propelling mechanism of the power driven truck embodied in the arc welding mechanism described in my prior United States Patent No. 1,991,128, dated Feb. 12, 1935, and in my co-pending application Serial No. 184,120, filed Jan. 10, 1938. Such mechanism (see Figure 4) comprises a rapid travel motor 27 and a slow speed travel motor 28 adapted to be used alternately for propelling the truck at different speeds depending on operating conditions. Motor 27 serves to drive the truck axle 29 through a suitable drive connection comprising the gearing 30 and magnetic clutch 31. Motor 28 serves to drive the same axle through a similar drive connection comprising the gearing 32 and magnetic clutch 33. The magnetic clutches 31 and 33 are electrically interlocked as described in my prior Patent 1,991,128, or in any other suitable manner to prevent simultaneous engagement thereof. When operating current is supplied to motor 27 the magnet of clutch 31 is automatically energized to establish a drive connection between the motor 27 and axle 29. This motor is used to effect rapid or high speed travel of the truck 10 when returning the welding head 5 to its starting position after completion of a seam welding operation or whenever it is desired to quickly bring the welding head to a desired position. By deenergizing the motor 27 and energizing the motor 28 the truck 10 and welding head 5 may be moved at a desired welding speed.

In order to prevent slippage of the truck wheels 19 on the track rails 20 one of said wheels is provided with a gear 19a (Figure 4) meshing with a rack 19b carried by one of the rail supporting beams 23.

Figure 2:
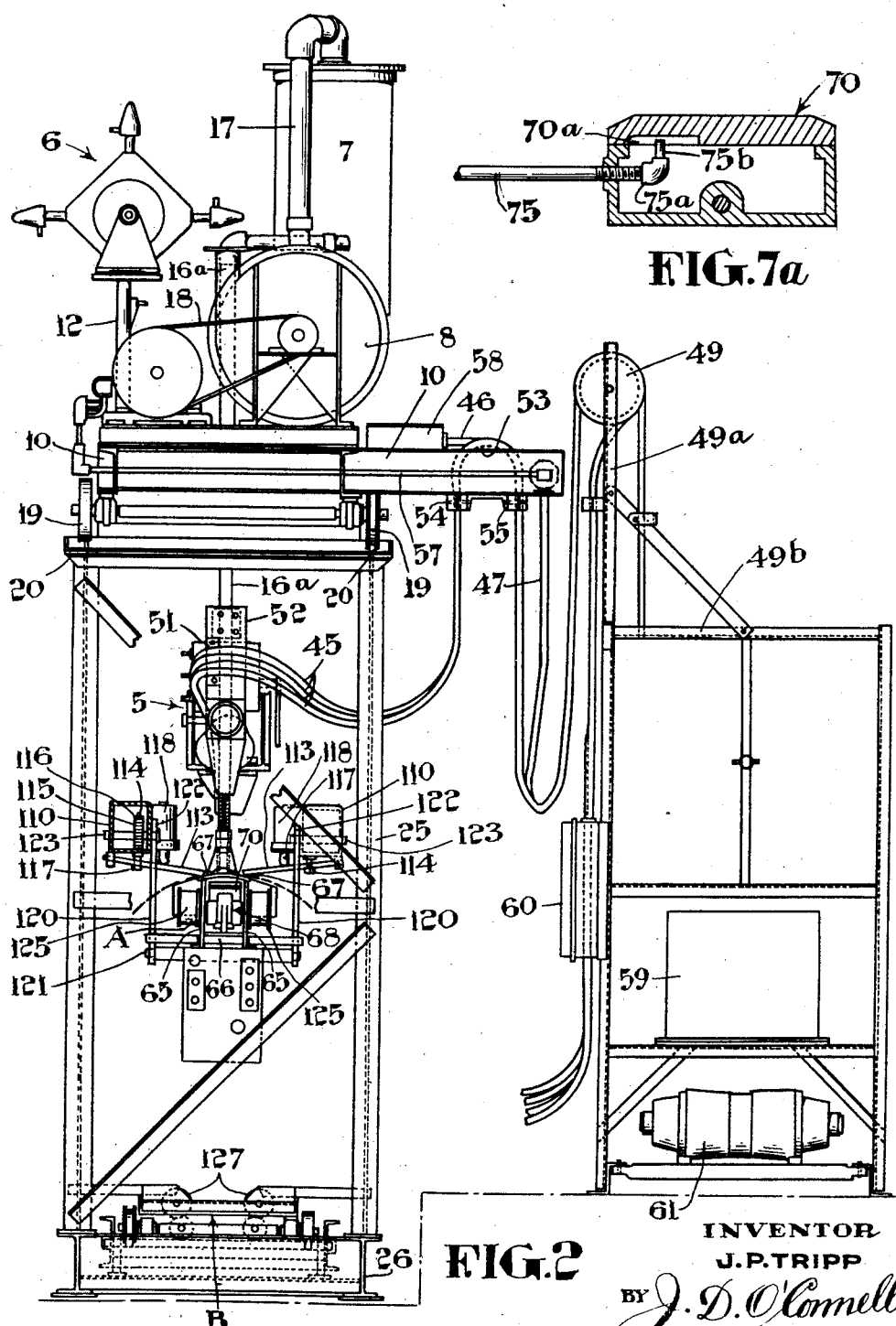
Figure 2 is an end elevation looking toward the right hand end of the installation appearing in Figure 1.

The welding and control cables leading to the welding head and electrical equipment are indicated at 45, 46 and 47 in Figures 1, 2 and 4. As shown in Figure 2, these cables are looped over a pulley 49 carried by a pulley frame 49a rising from a cabinet structure 49b arranged at one side of the frame supporting the welding head truck. The welding cables 45 are passed from the pulley 49 to suitable contacts on the welding head 5 as indicated at 51 in Figure 1. These cables are clamped to a plate 52 carried by the flux return pipe 16a. They are also passed around a guide block 53 (Figure 2) on truck 10 and secured in place by additional clamps 54 and 55. The cable 47 supplies current to motor 9 and is passed to said motor through a rigid conduit 57 (Figs. 2 and 4) carried by the truck 10. Cable 46 is also passed over the guide block 53 to a junction box 58 on truck 10 and is preferably secured in place by the clamp 55. The cabinet structure 49b carries the control panel 59, magnetic starter 60, generator 61 and other accessories which need not be described in detail since they are not claimed as part of the present invention.

The work supporting arm A is supported adjacent one end by the vertical frame structure 24. This arm comprises side members 65 and a bottom member 66. The space between the upper edges of the side members 65 is left open except at points adjacent opposite ends of the arm where front and rear cover plates 67 and 67a (Figs. 1 to 3 inclusive) are provided. The wheels 5a (Fig. 1) of the welding head 5 are supported on the front cover plate 67 when the welding head is arranged at the free end of the arm A preparatory to being moved rearwardly over the work 21. As the wheels 5a pass beyond the rear end of the pipe during the welding operation they pass onto and are supported by the rear cover plate 67a. A backing plate carriage 68 (see Figs. 2 and 5 to 8 inclusive) is arranged to travel on the bottom plate 66 of arm A between the side members 65. This carriage supports the backing plate 70 and the backing plate adjusting frame 71. The backing plate 70 comprises a hollow casing provided with an internal longitudinally extending partition 72, dividing the interior of the casing into two compartments connected, at one end of the partition, by a communication passage 73 (Fig. 7). Cooling fluid is supplied to the compartment at one side of partition 72 by a pipe 74 and is withdrawn from the compartment at the opposite side of the partition by a pipe 75. At the ends remote from the hollow backing plate 70 the pipes 74 and 75 are connected by flexible hose sections 77 and 78 (Figs. 1 and 3) and rigid conduits 79 and 80 to flexible water supply lines 81 and 82. The rigid conduit sections 79 and 80 are fastened by clamps 83 to a vertical member 84 which is carried by and travels with the truck 10. The lower end of member 84 is also fastened to one end of a draw bar 85 as indicated at 86 in Fig. 1. The remaining end of draw bar 85 (see Fig. 8) is provided with a yoke 87 which is fastened by a coupling pin 88 to the side members 90 of the backing plate carriage 68. It will thus be seen that the backing plate carriage 68 travels with the welding head truck 10 and causes backing plate 70 to follow the travel of the welding head 5 along the seam. In other words the backing plate moves with the welding head and always maintains its proper position relative thereto.

As shown in Figure 7a, the backing plate return pipe 75 is provided, within the hollow casing of the backing plate, with an elbow 75a and an upwardly projecting nipple 75b. In order to prevent air trapping, the upper end of the nipple 75b is disposed within a narrow downwardly facing groove 70a formed in the backing plate cover.

Backing plate 70 is pivotally mounted between side members 92 of backing plate adjusting frame 71 as indicated at 93 (Figs. 6 and 7). The side members 92 of frame 71 are pivoted at one end to a bracket 94 mounted on carriage 68. The remaining ends of members 92 are formed integral with a plate 95 resting on the piston rod 97 of a piston 98 operating in cylinder 99 of the backing plate carriage 68. Air is supplied to and exhausted from the lower end of cylinder 99 through pipe 100 to raise and lower the piston 98.

When air is exhausted from cylinder 99 the piston 98 is lowered and permits the backing plate adjusting frame 71 to swing downwardly about the pivot 93 until the backing plate 70 is below the upper edges of the side members 65 of the work supporting arm A. This permits the work to be slipped onto the arm A, as hereinafter described, without interference by the backing plate. After the work has been properly positioned on the work supporting arm piston 98 is raised by air supplied through pipe 100 and acts against plate 95 to raise backing plate 70 into contact with the work (see Figs. 6 and 7).

Figure 3:
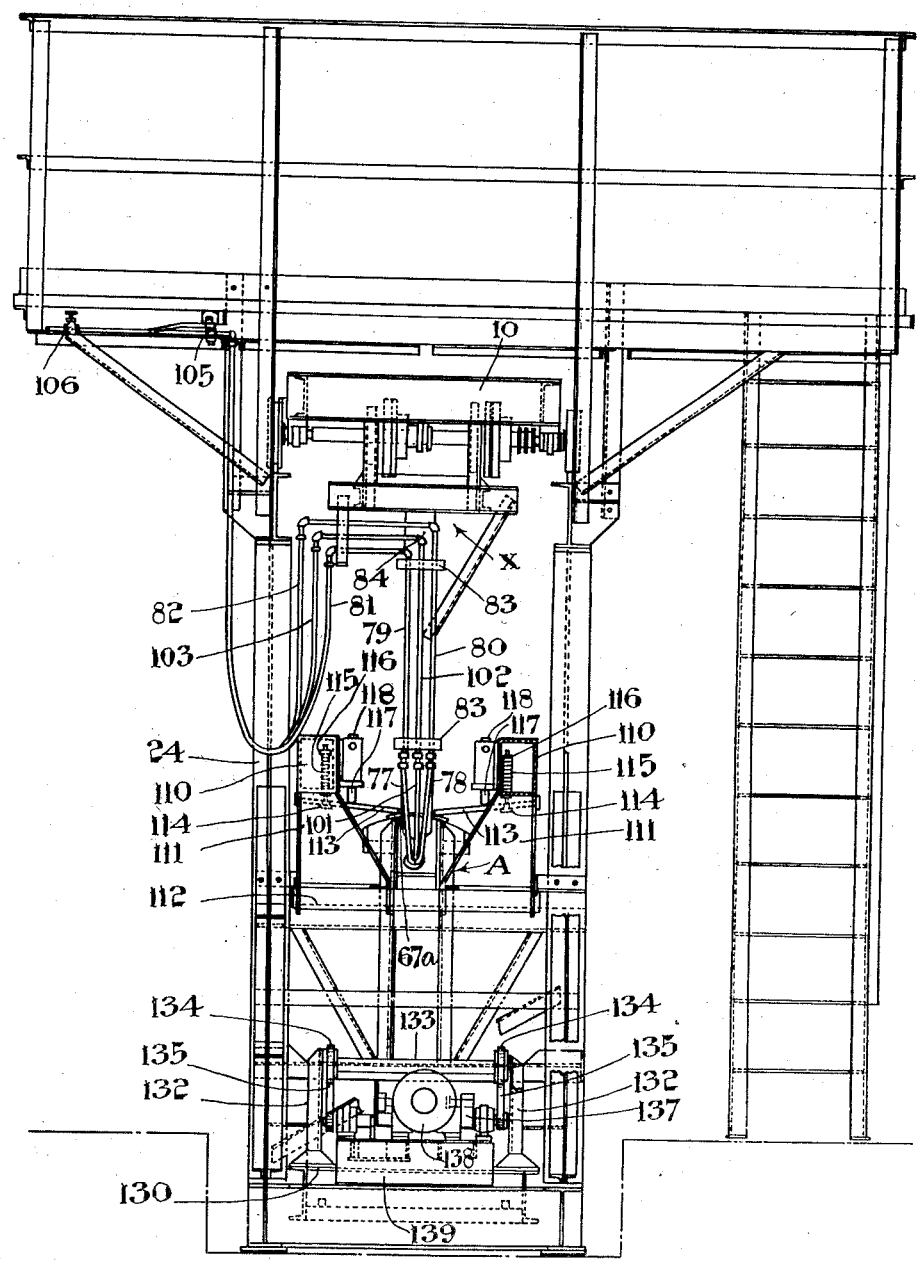
Figure 3 is an end elevation looking toward the left hand end of the installation appearing in Figure 1.

As shown in Fig. 3, the end of pipe 100 remote from cylinder 98 is connected, by flexible hose section 101 and rigid conduit section 102, to a flexible air supply pipe 103. The air and water supply pipes 81, 82 and 103 are provided with suitable valves 105, 106 and 107.

When the work 21 is arranged on the supporting arm A, as shown in Figs. 1, 6 and 7, it may be secured in place in various ways. In the present application I have disclosed both mechanical and magnetic clamping means. When the mechanical clamping means is used the magnetic clamping means is omitted and vice versa.

The mechanical clamping means comprises a pair of hollow clamping arms 110 located above and at opposite sides of the work supporting arm A. One end of each clamping arm 110 is pivotally fastened to the corresponding end of the work supporting arm A by means of the depending brackets 111 (Fig. 3) and pivot shaft 112. Each arm 110 carries a plurality of clamping bars 113 having one end pivoted thereto and the other end disposed to bear against the work 21. A bolt 114 is attached to the intermediate portion of each clamping bar and extends upwardly within the associated clamping arm 110. Each bolt is encircled by a spring 115 which normally acts against an abutment 116, at the upper end of the bolt, to raise the free end of the clamping bar 113. During welding operations, the clamping bars 113 are pressed to the work, against the opposition of springs 115, by pressure applying plungers 117 working in air cylinders 118 attached to the inner sides of the clamping arms 110. Air is supplied to and exhausted from these cylinders in any suitable manner so that the plungers may be forced downwardly to apply the clamping bars or may be sufficiently relieved of air pressure to permit release of the clamping bars by the springs 115.

The work supporting arm A is provided with latches 120 pivoted thereto as indicated at 121. The free ends of these latches are provided with hooks 122 adapted to be engaged over pins 123 carried by the pivotally mounted clamping arms 110. If the operator fails to hook these latches over the pins 123 before operating the clamping bars 113 the clamping arms 110 will revolve about their pivotal axes 112 and will be undamaged.

If desired the clamping arms 110 and associated clamping bars 113 may be replaced by magnetic clamping or work holding means comprising a series of magnets 125 fastened to opposite sides of the work supporting arm A. These magnets may be energized in any suitable manner to attract the work 21 and hold it in place on the clamping arm A.

While no arc is visible during the welding of pipes or plates by the "Unionmelt" process, experience indicates that this is actually an arc welding process in which the arc is submerged in and concealed by the welding flux. With this in mind the work holding magnets provided in accordance with this invention are arranged to guard against magnetic deflection of the arc when the magnetic work holding means is employed in place of the mechanical clamping means. To this end the magnets are arranged as shown in Fig. 6 so that one pole piece of each magnet is formed by the adjacent side 65 of the arm A while the remaining pole piece is formed by a plate 125a spaced outwardly from the member 65. This locates the magnetic field of each magnet so that the main flux path is along the circuit indicated by the arrow 125b. It will thus be seen that the main magnetic flux of each magnet is located to one side of the welding zone and clear of intersection with the arc. In practice it has been found that, with this arrangement of the magnets, any magnetic leakage which is dispersed so far as to reach the welding zone is of such low intensity as to produce no objectional magnetic deflection of the arc. The pole pieces of each magnet 125 are preferably bridged by thin brass sheets 125c which are provided to protect the residual magnetism when the magnets are deenergized.

The pipe or work 21 is positioned on the work supporting arm A by means of a work supporting truck B on which the work is initially placed. This truck is provided with work supporting rollers 127 so that the work may be freely rotated on the truck to any desired position prior to being pushed onto the work supporting arm A.

The wheels 128 of truck B travel on the rails 129 mounted on a movable platform 130. One end of this platform is mounted to swing about a pivotal axis 131. The other end is provided with vertically extending brackets 132 carrying a roller shaft 133 equipped with rollers 134. These rollers are arranged to ride the peripheral edges of suitable eccentric discs 135 fixed to a shaft 136 which is driven through suitable gearing 137 by an electric motor 138 mounted on a stationary base 139. The platform 130 is normally disposed in a horizontal position and the truck 127 is moved to the left from the position shown in Fig. 1 to a position beneath the work supporting arm A. During this movement of the truck the work 21 is passed onto the work supporting arm A. The motor 138 is then operated to turn the eccentric discs 135 in a platform lowering diection whereby the truck 127 is moved downwardly to leave the work 21 suspended on the arm A to which the work is then clamped by either of the methods previously described.

Having thus described my invention, what I claim is:

In electric welding apparatus the combination of a horizontal work supporting arm, a backing plate carriage supported by and movable longitudinally of said arm, a backing plate supporting frame having one end pivoted to said carriage to provide a horizontal axis about which the frame is swingable in a vertical direction, a backing plate pivoted to said frame to permit the backing plate to assume a horizontal position irrespective of the angular inclination of the frame with reference to said carriage and means for raising and lowering the free end of said frame.

JOHN P. TRIPP.